Figure 1:
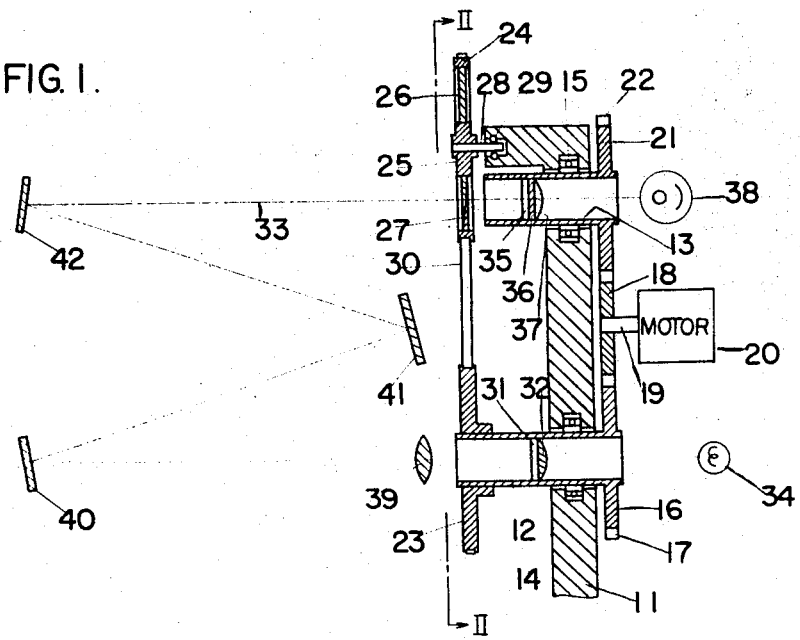

United States Patent
Iwahashi

[15] 3,687,554
[45] Aug. 29, 1972

[54] SPECTROSCOPIC MEASUREMENT SYSTEM USING ROTATING PATTERNED GRILL MEMBERS

[72] Inventor: Kenji Iwahashi, Kyoto, Japan
[73] Assignee: Shimadzu Seisakusho Ltd., Kyoto-shi, Japan
[22] Filed: Dec. 24, 1970
[21] Appl. No.: 101,275

[30] Foreign Application Priority Data

Dec. 24, 1969  Japan .................. 44/104596
June 10, 1970  Japan .................. 45/50634
June 17, 1970  Japan .................. 45/52503

[52] U.S. Cl. ............... 356/74, 250/226, 250/237 G, 356/97
[51] Int. Cl. ........................ G01j 3/00, G01j 3/42
[58] Field of Search ............ 356/74, 79, 96, 100, 51; 250/226, 237 G

[56] References Cited

UNITED STATES PATENTS 3,383,978   5/1968   Girard ..................... 356/74

Primary Examiner—Ronald L. Wibert
Assistant Examiner—V. P. McGraw
Attorney—Craig, Antonelli & Hill

[57] ABSTRACT

A novel system for spectroscopic measurement adaptable in spectrum analysis utilizing a plurality of moire patterns. In order to improve the resolving power of the spectroscopic instrument without any reduction in the intensity of radiant energy to be measured, a pair of grills each having a plurality of narrow slits are disposed at the entrance side and the exit side with respect to a light source. The spectroscopic measurement is performed by discriminating a moire pattern formed by a radiant beam of specific wave length, which is static with respect to the movement of the exit grill, from other moire patterns formed by radiant beams which are dynamic with respect to the movement of the exit grill. In addition, to facilitate the electrical measurement of the intensity of radiant energy, means for giving a pulsating characteristic to a beam of light to be sensed by a photomultiplier tube is provided.

18 Claims, 12 Drawing Figures

PATENTED AUG 29 1972

3,687,554

SHEET 1 OF 5

INVENTOR
KENJI IWAHASHI
BY
Craig, Antonelli, Stewart & Hill
ATTORNEYS

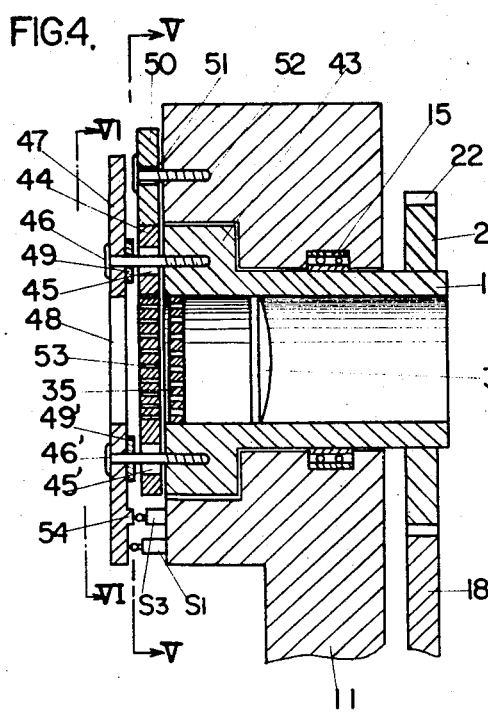
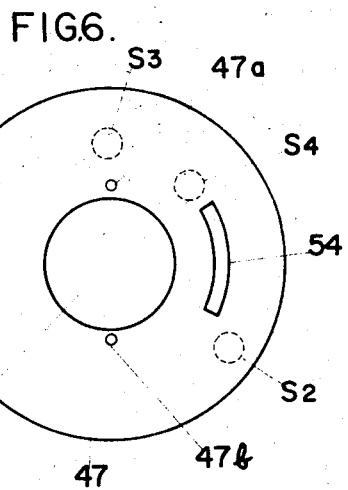
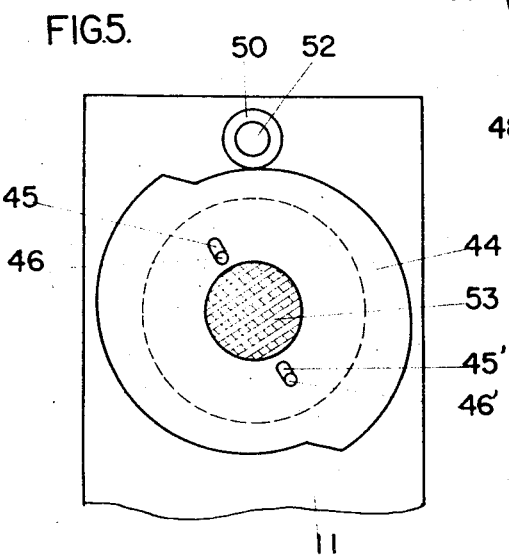

SPECTROSCOPIC MEASUREMENT SYSTEM USING ROTATING PATTERNED GRILL MEMBERS

The present invention relates to a novel system for spectroscopic measurement adaptable in spectrum analysis while the intensity of radiant energy can be advantageously increased without the often associated sacrifice of resolution.

Various types of spectroscopic instrument have heretofore been proposed such as comprising a diffraction grating or prism. Nevertheless, these spectroscopic instruments have a common feature in that a single linear slit is employed in the optical system. However, in such conventional instruments, it has been well known that employment of a slit of small slit width is necessary in order to improve the resolving power of the instrument while that of a slit of large slit width is necessary in order to improve the intensity of radiant energy to be measured. These requirements are incompatible according to the prior art even though achievement of these requirements is ideal.

In view of the above fact, one has often been encountered with an alternative depending upon his purpose of spectrum analysis to be done whether the spectroscopic device having a slit of small slit width or having a slit of large slit width should be selected.

Accordingly, the present invention has been made in view to eliminating the abovementioned inconvenience and directed to provide a novel system for spectroscopic measurement adaptable in spectrum analysis fulfilling the abovementioned requirements.

One object of the present invention is therefore to provide a novel system for spectroscopic measurement comprising an entrance grill formed with a plurality of linearly equally juxtaposed slits, means for dispersing a beam of light which may be in the form of a diffraction grating or a prism and an exit grill of the same construction as that of the entrance grill, all of these components being adapted to form a plurality of superimposed moire patterns on the exit grill in cooperation therewith which are utilized to discriminate a beam of light of specific wave length from that of others by means of a radiant beam discriminator.

Another object of the present invention is to provide a novel system for spectroscopic measurement comprising a single grill formed with a plurality of linearly equally juxtaposed slits, means for dispersing a beam of light which may be in the form of a diffraction grating or a prism and an optical system by which a plurality of superimposed moire patterns can be formed on the grill by means of beams of light diffracted by said dispersing means according to the wave length, said moire patterns being adapted to discriminate a beam of light of specific wave length from that of others.

A further object of the present invention is to provide a novel system for spectroscopic measurement comprising means for giving a pulsating characteristics to a beam of light of specific wave length screened through the moire patterns by regular and frequent interruptions so as to enable the intensity of the beam of light of specific wave length to be electrically measured.

Before the description of the present invention proceeds, a brief description of a moire pattern will be hereinafter given. It has been well known that, a pair of slit members both being formed with a plurality of equally spaced slits of the same number and area are overlapped in the displaced condition with respect to the plane of each slit member and then moved or rotated in the opposite directions, one can perceive the formation of a certain striped pattern which is generally referred to as moire pattern. In the following description of the present invention, even though a plurality of such moire patterns are employed, this simple form of moire pattern plays an important role in that it is utilized to discriminate a radiant beam of specific wave length to be detected from that of others.

It should however be noted that the both slit members as hereinabove recited are referred to as an entrance grill and an exit grill, respectively, while the wordings "entrance" and "exit" will become apparent from the following description and will also be better understood by those skilled in the art.

Figure 2:
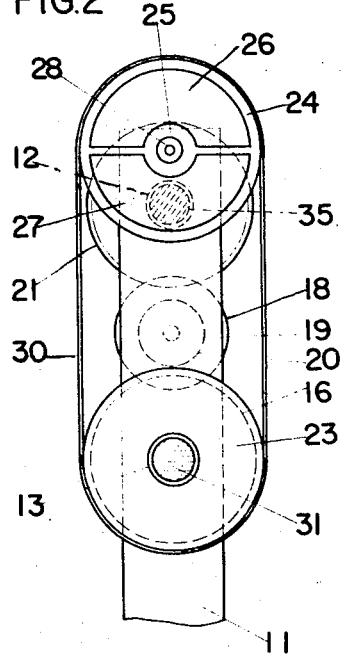
Figure 3A:
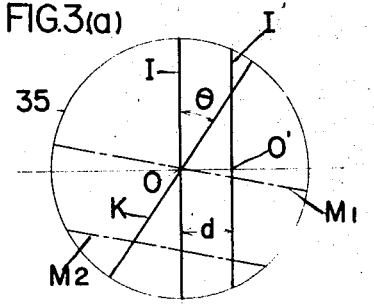
Figure 7:
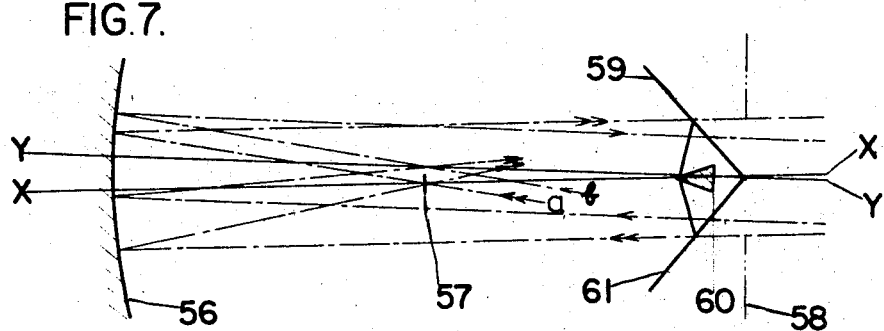
Figure 8:
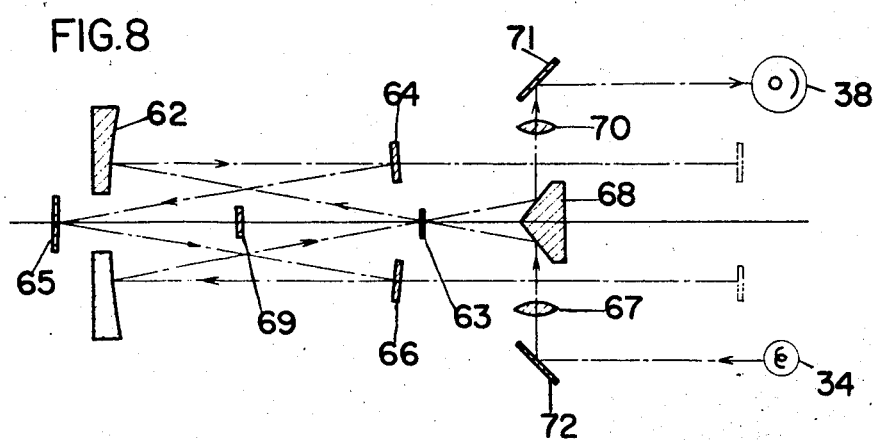
Figure 9:
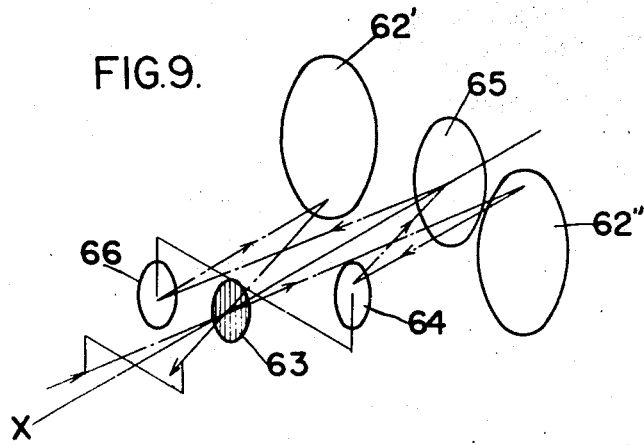
Figure 10:
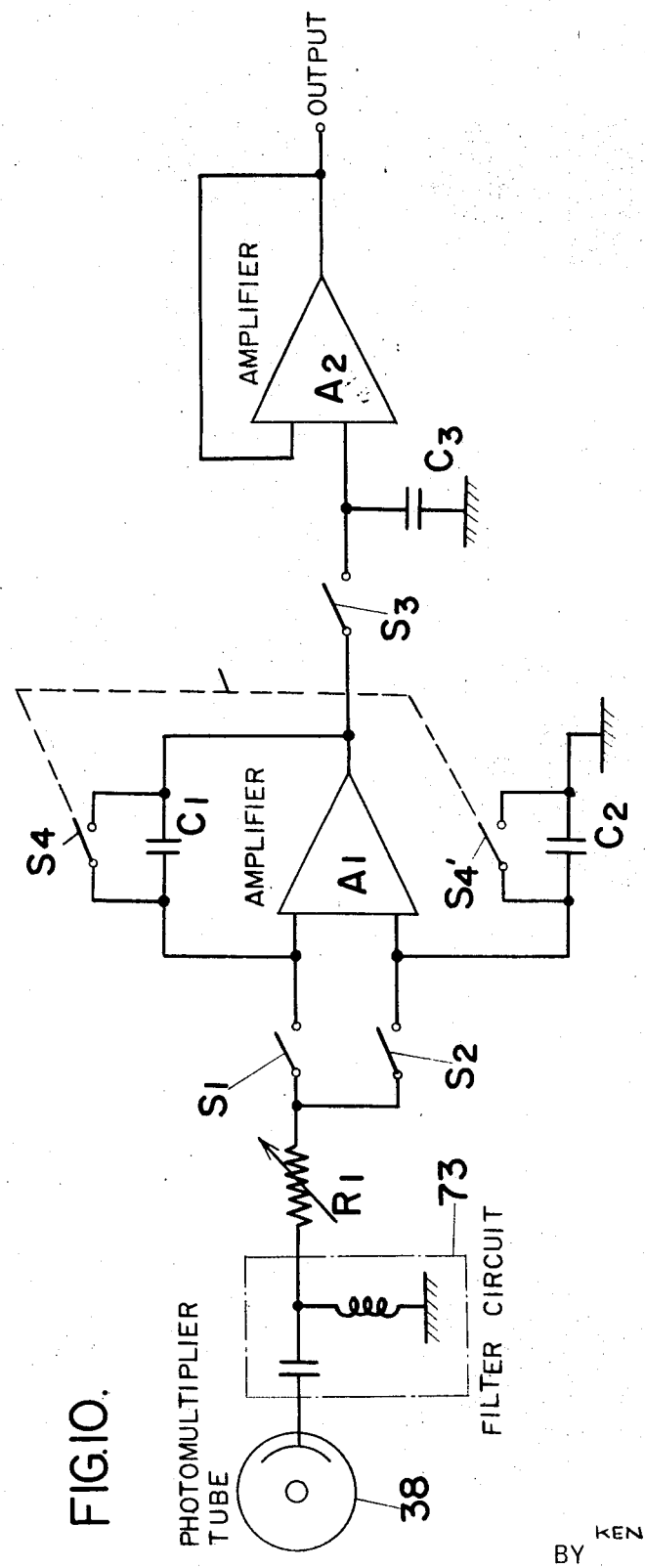
Figure 11:
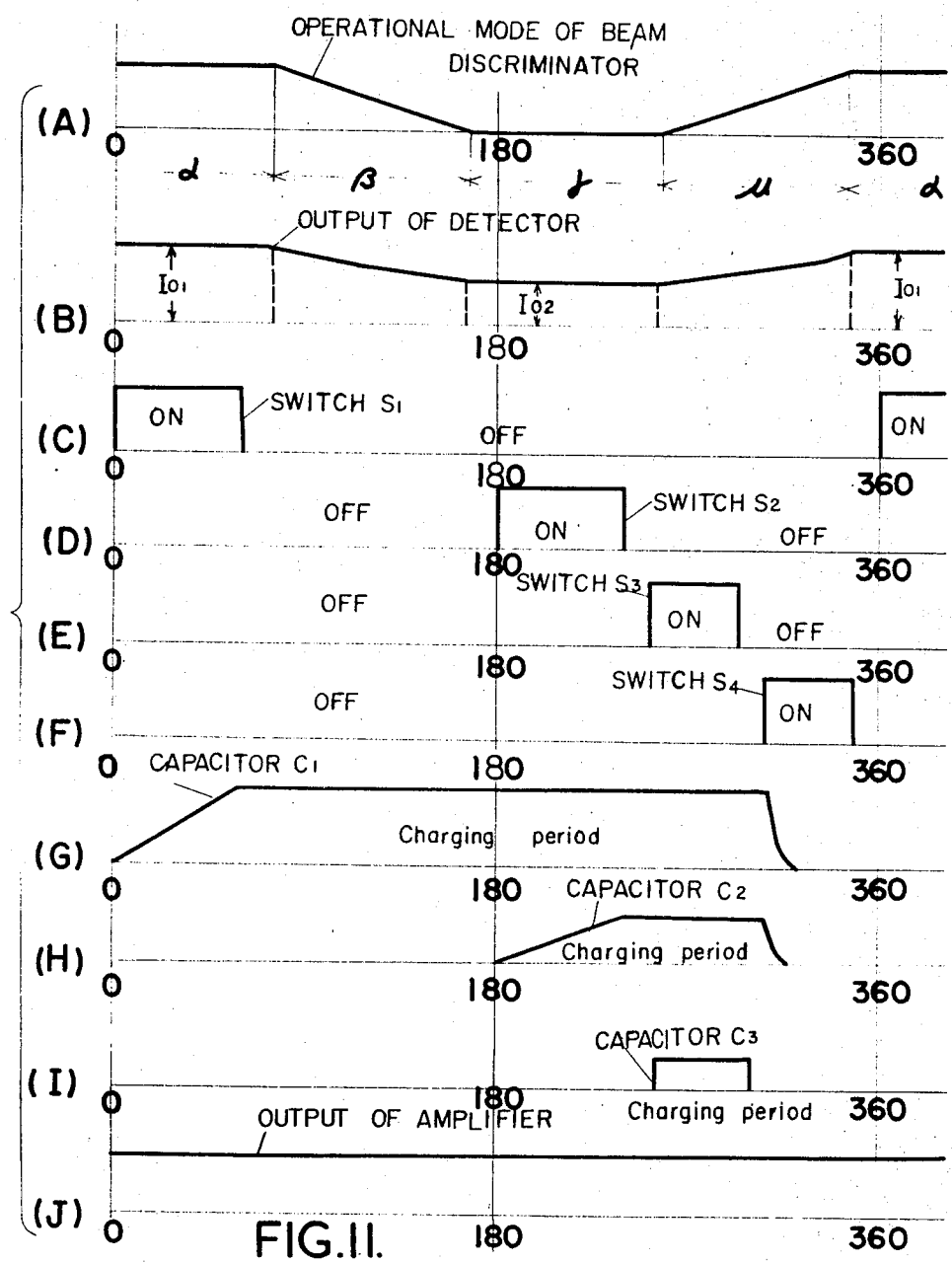

The present invention will be hereinafter fully described in conjunction with preferred embodiments thereof with reference to the accompanying drawings taken only for the sole purpose of illustration thereof, in which;

FIG. 1 is a schematic diagram showing a spectroscopic measurement system in one embodiment according to the present invention, FIG. 2 is a sectional view of the system taken along the line II—II in FIG. 1, FIGS. 3(a) and (b) are schematic diagram showing superimposed moire patterns respectively formed by a radiant beam of specific wave length and a radiant beam of another wave length, FIG. 4 is a sectional side view, on an enlarged scale, of an upper portion of the system of FIG. 1 showing another preferred embodiment of the present invention, FIG. 5 is a sectional view taken along the line V—V in FIG. 4, FIG. 6 is a sectional view taken along the line VI—VI in FIG. 4, FIG. 7 is a schematic diagram showing an optical system for better understanding of the principle of the present invention, FIG. 8 is a schematic diagram showing a spectroscopic measurement system in a further embodiment according to the present invention in which the optical system shown in FIG. 7 is employed, FIG. 9 is a perspective view of a portion of the system shown in FIG. 8, FIG. 10 is a circuit diagram showing a circuit for converting the measured intensity of radiant energy into an electrical signal and FIG. 11 is a chart showing the timing relation of the operation of various components of the system of the present invention.

Referring now to FIG. 1 and FIG. 2, one preferred embodiment of the spectroscopic measurement system according to the present invention is shown wherein a radiant beam discriminator means for discriminating a moire pattern formed by a radiant beam of specific wave length from that formed by radiant means of other wave lengths comprises an optical device.

Reference numeral 11 represents a bench on which a pair of suitably spaced barrels 12 and 13 are rotatably supported by means of respective bearings 14 and 15.

The barrel 12 is formed at its right-hand end with a gear wheel 16 having gear teeth 17 in mesh with a pinion 18 connected with an output shaft 19 of a motor 20. The barrel 13 is formed at its right-hand end with a gear wheel 21 of the same construction as that of the gear wheel 16 having gear teeth 22 in mesh with the pinion 18. The motor 20 is adapted to rotate the both barrels 12 and 13 at a relatively high speed in the opposite directions with respect to each other. However, in a modification, the both barrels 12 and 13 may be rotated in the same directions. Mounted on the other left-hand end of the barrel 12 is a pulley 23 which may be integrally formed therewith.

Reference numeral 24 is a pulley-like wheel having a hub 25 and a pair of segmental windows into which a collimating lens 26 and an achromatic prism 27 are respectively accommodated. This pulley-like wheel 24 has the hub 25 connected with the adjacent end of a shaft 28, the other end of said shaft 28 being rotatably supported by the bench 11 through a suitable bearing 29, in such a manner that each of the windows can be brought into register with the barrel 13 as the wheel 24 is rotated, which rotation can be achieved by an endless belt extended between the pulley 23 and the pulley-like wheel 24.

In the arrangement as hereinbefore described, it will be clearly understood that, when the motor 20 is driven, the barrels 12 and 13 can be rotated in the opposite directions with respect to each other at the same speed. In synchronism with the rotation of the barrel 12, the pulley-like wheel 24 can also be rotated by means of the endless belt 30.

Rigidly disposed within the barrel 12 is an entrance grill 31 formed with a plurality of linearly equally juxtaposed slits, and a field viewing lens 32, all of these elements being in alignment with an optical path 33 and a suitable light source 34, while similarly disposed within the barrel 13 is an exit grill 35 formed with a plurality of linearly equally juxtaposed slits, a mask 36 and a field viewing lens 37, all of these elements being in alignment with the optical path 33 and a photomultiplier tube 38.

Figure 3:
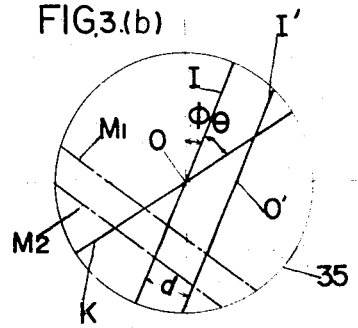

The entrance grill 31 may be of the same construction as that of the exit grill 35 in respect of the number of the slits and area and may be made of a resin film or metal. In the case where metal is employed for the both grills 31 and 35, the slits thereon can be formed by the known etching technique. No limitation is required in arrangement of the both grills 31 and 35 with respect to each other. However, for the convenience of description of the present invention, in the instance as shown, the length of each slit of the entrance grill 31 is displaced with respect to the length of each slit of the exit grill 35 by an angle $\theta$ as indicated in FIG. 3, this angle $\theta$ of displacement being determined such that a moire pattern as will be mentioned later can be distinctly represented.

Disposed on the optical path 33 is a corrective lens 39 for correcting the optical path of the light transmitted from the light source 34 through the entrance grill 31, a first reflector 40 for reflecting the light from the light source toward a diffraction grating 41, and a second reflector 42 for reflecting the radiant beams thus diffracted toward the photomultiplier tube 38 through the exit grill 35. These elements 39, 40, 41 and 42 are supported by a portion (not shown) of the bench 11 or any other suitable structure in a known manner.

The arrangement of the optical elements is such that an image of the entrance grill 31 carried by one of the radiant beams of specific wave length of which the light intensity is to be measured can be projected on the exit grill 35 with its center in alignment with that of the exit grill 35. For better understanding, it is herein assumed that each grill 31 or 35 is of circular shape and has a single slit passing through the center of the grill as indicated by I or K in FIG. 3. Then, as can be understood from FIG. 3, the arrangement of the optical elements is such that, if the presence of the diffraction grating 41 is neglected, the image of the entrance grill can be projected on the exit grill by means of the light source in such a manner that the center of the entrance grill coincides with that of the exit grill as if the both grills are superimposed. However, since the diffraction grating 41 acts to disperse a beam of light into a plurality of radiant beams according to wave lengths, it is apparent that a plurality of images of the entrance grill 31 are in practice formed by the dispersed radiant beams which are in turn projected on the exit grill 35. While in this condition, one can perceive the formation of a plurality of striped patterns on the exit grill when the latter is viewed from the right side at a position corresponding to the photomultiplier tube, which each of the striped patterns is generally referred to as a moire pattern.

According to the present invention, since the barrels 12 and 13, that is, the entrance and exit grills 31 and 35 are both adapted to relatively rotate, the only one of the striped patterns or moire patterns formed by a radiant beam of specific wave length of which the light intensity or intensity of radiant energy is to be detected is in the static condition while the others are in the dynamic condition in relation to the rotation of each barrel or grill. This will be fully described with reference to FIG. 3 in which different scenes attributable to the rotation of the entrance and exit grills 31 and 35 which can be viewed from the position corresponding to the photomultiplier tube 38 are schematically illustrated.

Referring now to FIG. 3, it is to be noted that, for the convenience of simplification, the only one of the slits K passing through the center O of the exit grill 35 is illustrated. Similarly, the only one of the slits passing through the center of the entrance grill 31 is employed and this slit of the entrance grill 31 is assumed to be projected by a radiant beam of specific wave length on the exit grill 35 in the form of an slit image I intersecting the slit K of the exit grill at the center of the latter. As hereinbefore described, since the diffraction grating 41 acts to disperse a beam of light from the light source 34 and some of the dispersed radiant beams travel through the barrel 13, a representative of a plurality of images of the slit of the entrance grill carried by the dispersed radiant beams other than that of specific wave length is illustrated in the form of another slit image I' extending in parallel with the slit image I. However, the distance d between the both slit images I and I' depents upon the characteristic of the diffraction grating employed and is normally proportional to the angle in which a radiant beam carrying the slit image I' is dispersed with respect to the radiant beam of specific wave length carrying the slit image I. The moire pattern consists of a plurality of dark bands of which only two are illustrated in FIG. 3 as indicated by $M_1$ and $M_2$.

The principle in which the intensity of radiant energy of specific wave length can be measured by the utilization of the moire patterns will be hereinafter fully described.

When the entrance and exit grills 31 and 35 are relatively rotated, only the moire pattern formed by the radiant beam of specific wave length does not vary while that formed by other radiant beams vary. For example, if the entrance and exit grills are rotated in an angle $\phi$ from the condition as illustrated in FIG. 3(a) to the condition in FIG. 3(b), the relation between the slit image I and the slit K of the exit grill as defined by the angle $\theta$ does not vary and the moire pattern formed by the radiant beam of specific wave length does not therefore undergo any motion.

However, another slit image I' is at this time rotated around the center O' and, therefore, in the condition of FIG. 3(b), the distance $d$ is reduced to as indicated by $d'$. The reduction of the distance $d$ results in the movement of the moire pattern. That is, every time when the difference between the distances $d$ and $d'$, or $(d-d')$, is expressed by an integral multiple of the constant depending upon the characteristic of the grill, the moire pattern can be moved each pitch.

From the foregoing description, it can thus be understood that the moire pattern formed by the radiant beam of specific wave length is in the static condition while the moire patterns formed by other radiant beams are in the dynamic condition while the entrance and exit grills 31 and 35 are respectively rotated.

Referring back to FIG. 1, the spectroscopic measurement system according to the present invention is provided with means for discriminating the moire pattern formed by the radiant beam of specific wave length, which is hereinafter referred to as static moire pattern, from the moire patterns formed by the radiant beams of other wave length, each of which is hereinafter referred to as dynamic moire pattern.

This discriminating means comprises the mask 36 and a combination of the collimating lens 26 with the achromatic prism 27 preferably of small angle of deflection. As hereinbefore described, the lens 26 and the prism 27 are individually mounted on the pulley-like wheel 24 rotatable in synchronism with the rotation of either of the barrels 12 and 13.

The mask 36 is rigidly mounted within the barrel 13 at a position between the exit grill 35 and the field viewing lens 37 and is formed with a plurality of linearly equally juxtaposed slits. This mask 36 should be arranged in such a manner that each slit of the mask 36 is in register with the corresponding opaque portion of the static moire pattern. In other words, the slit width of each slit of the mask 36 corresponds to that of each opaque portion of the static moire pattern.

The arrangement of the discriminating means is such that, during a period in which the collimating lens 26 is brought into register with the exit grill 35, the radiant beam of specific wave length can be entirely shielded and the intensity of radiant energy screened through the dynamic moire patterns can be sensed by the photomultiplier tube 38. On the other hand, during a period in which the achromatic prism 27 is brought into register with the exit grill 35, all of the radiant beams can be deflected to that the static and dynamic moire patterns can be shifted from the original position to the deflected position and, therefore, the intensity of radiant energy screened through the static and dynamic moire patterns can be sensed by the photomultiplier tube 38. However, it is to be noted that the intensity of radiant energy screened through the dynamic moire patterns varys in conformity with the rotation of the barrel 13 or the movement of the dynamic moire patterns from one time to another during each period in which the lens 26 is in register with the exit grill 35.

If the integrated value of the light intensity measured by the photomultiplier tube 38 during a period in which the prism 27 is in register with the exit grill 35 is assumed to be $Io_1$ while that of the light intensity measured thereby during another period in which the collimating lens 26 is in register with the exit grill 35 is assumed to be $Io_2$, then, the intensity of the radiant beam of specific wave length to be measure can be given by the difference between the both light intensities or $Io_1 - Io_2$.

However, it is to be noted that the pulley-like wheel 24 mounted with the lens 26 and the prism 27 may be replaced by a rotatable reflector device provided with a pair of reflector planes displaced a certain angle to each other with respect to its common supporter shaft. This reflector device may be disposed in such a manner that each radiant beam reflected upon the reflector 42 travels through the exit grill 35 after reflected upon either of the reflector planes thereof.

Although the discriminating means as hereinbefore described is an optical device, a mechanical one may be employed. This is particularly shown in FIG. 4 in which only the corresponding portion of the spectroscopic measurement system of the present invention is shown on a somewhat enlarged scale.

In the example shown in FIG. 4, the discriminating means comprises a combination of a movable mask 44 formed with a pair of slots 45 and 45' and a plurality of linearly equally juxtaposed slits 53. This movable mask 44 is loosely fitted to the left extremity of the barrel 13 by means of a pair of fastening members 46 and 46' respectively extended through the slots 45 and 45'. These fastening members 46 and 46' also serve to limit the movement of the mask 44 as will be mentioned later.

The structure of the movable mask 44 is clearly shown in FIG. 5 in the form of a cam plate having a pair of opposed cam portions on its periphery. By way of example, this movable mask 44 can be formed by combining two semi-circular members each having the radius as expressed by $r$ in the displaced condition, the value of such displacement being equal to the distance between the centers $P_1$ and $P_2$ of the respective semicircles. It is to be noted that the movable mask 44 can be integrally formed by any known method into the shape as illustrated in FIG. 5.

Disposed above the movable mask 44 and rotatably fitted to a portion of the bench 11 by means of a fastening member 52 is a roller 50 having a through hole 51 through which said fastening member 52 is extended. In the condition as illustrated in FIG. 5 wherein the movable mask is moved, for example, to the second position, the roller 50 is in contact with the periphery of the right-hand semicircular portion of the mask 44.

However, as the mask 44 is rotated and accordingly moved to the first position, the roller 50 contacts the periphery of the left-hand semicircular portion of the mask 44. This can be achieved by means of a centrifugal force acting on the movable mask 44 since the latter is also rotated at a relatively high speed in synchronism with the rotation of the barrel 13.

If the distance between the centers $P_1$ and $P_2$ is equal to half the pitch between one strip to another of the static moire pattern, the static moire pattern can be brought in or out of step with the slits of the movable mask 44 as the barrel 13 or the exit grill 35 is rotated. Therefore, it will be apparently understood that the same results can be obtained as in the case of the optical discriminating means.

From the foregoing description, it is apparent that the distance of movement of the movable mask 44 from the first position to the second position is proportional to the difference between the centers $P_1$ and $P_2$ or a multiple of integer of half the pitch between one dark band or opaque portion to another of the static moire pattern.

Provided to the left of the movable mask 44 is a disc 47 formed with a centrally disposed opening 48 of the diameter equal to or more than that of the opening of the barrel 13, a segmental notched portion 55 and a segmental projection 54 as shown in FIG. 6. This disc 47 is also formed with a pair of holes 47a and 47b through which the common fastening members 46 and 46' are respectively inserted. However, the disc 47 is seated against the head portion of each fastening member 46 or 46' and restricted of its loose movement by a pair of washer members 49 and 49'.

Disposed on a portion of the bench 11 in alignment with the path of travel of the notched portion and the projection 54 is switches $S_1$, $S_2$, $S_3$ and $S_4$, of which only two $S_1$ and $S_3$ are illustrated, these switches being disposed in the circuit as shown in FIG. 10. The switches $S_1$ and $S_2$ are adapted to be closed by the notched portion 55 while the remaining switches $S_3$ and $S_4$ are adapted to be closed by the projection 54. The arrangement of these switches with respect to the rotation of the disc will be described later in connection with the operation of the spectroscopic measurement system of the present invention with reference to FIG. 11. However, it is to be noted that a combination of the disc with these switches serves as chopper means for giving a pulsating characteristics to a beam of light of specific wave length screened through the moire patterns by regular and frequent interruptions. In fact, this chopper means does not interupt the beam of light itself, but the beam of light can be interupted in the sense that the circuit as shown in FIG. 11 is operated to measure the intensity of said beam of light.

The optical system which may be employed in the present invention is shown in FIG. 7 to FIG. 9.

Referring to FIG. 7 in which the principle of the optical system is shown, reference numeral 56 is a concave mirror of which the focus is provided with a single grill 57 formed with a plurality of linearly equally juxtaposed slits. This single grill 57 corresponds to a combination of the entrance and exit grills 31 and 35 which are hereinbefore recited. Reference numeral 58 is an imaginary aperture disposed at a position apart from the mirror 56, the distance therebetween being equal to the radius of curvature of the mirror 56.

In this arrangement, assuming now that a beam of specific wave length, as indicated by $a$, is projected to the mirror 56 through the grill 57, this beam $a$ can be reflected upon the mirror 56 and thus travels in the parallel relation with the optical axis X toward a plane mirror 59 which is in turn projected to another plane mirror 61 across a prism 60. Even the beam $a$ thus reflected upon the mirror 61 travels in the parallel relation with the optical axis X toward the concave mirror 56, thus returning back to the grill 57 while forming a real image of the grill on the same grill 57. If the arrangement of the prism 61 and a combination of the mirrors 59 and 61 is such as hereinbefore described, another beam $b$ of light passing over the grill 57 as indicated by the single arrow headed line can be condensed at the focal point of the concave mirror 56. In such optical system, it can be considered that a bundle of light rays passing through the imaginary aperture 58 is focused on the focal plane which is served by the grill 57. Therefore, it will be understood that, since rays of light travel in parallel with the optical axis passing through the center of curvature of the concave mirror 56 and focused on the focal plane in the symmetrical relation with respect to said optical axis, no astigmatic and comatic aberrations exist in such optical system. In the case where such optical system is to be employed in the analysis of spectrum in the visible region, a correcting plate for correcting the spherical aberration may be disposed at a position adjacent to the imaginary aperture 58 or the concave mirror of small focal length can be employed.

Referring now to FIG. 8 and FIG. 9 in which a preferred form of optical system for use in the spectroscopic measurement system of the present invention which employs the principle as hereinbefore described with reference to FIG. 7 is shown, the grill 63 is disposed at the focus point of a concave mirror 62 which corresponds to the concave mirror 56 in FIG. 7. However, this concave mirror 62 has a centrally disposed bore in alignment with the optical axis of the system shown. The beam dispersing means as indicated by 65 in the form of a diffraction grating is situated at one of the conjugate points of either of reflectors 64 and 66. It will be understood that the optical system shown in FIG. 8 is substantially equivalent to that shown in FIG. 7.

Reference numerals 71 and 72 represent reflectors adapted for reflecting a beam of light projected by the light source 34 onto a prism 68 through a collimating lens 67 and reflecting a beam of light of specific wave length passing through a condensing lens 70 onto the photomultiplier tube 38, respectively. Reference numeral 69 represents a shielding plate for shielding unnecessary beams of light diffracted by the diffraction grating 65.

However, it should be noted that the grill 63 is adapted to rotate about the optical axis and the reflectors 64 and 66 are relatively displaced with respect to the line connecting therebetween across the optical axis at right angles particularly as shown in FIG. 9, whereby as the grill 63 is rotated about the optical axis the static and dynamic moire patterns can be formed in a substantially similar manner as hereinbefore described with reference to FIG. 1 or FIG. 4. It is also to be noted that, in FIG. 9, the concave mirror 62 shown in FIG. 8 is illustrated in the form of a pair of mirrors 62' and 62" each having the same radius of curvature as that of the mirror 56 for the sake of clarity.

The operation of the novel system for spectroscopic measurement according to the present invention will be hereinafter described particularly with reference to FIG. 10 and FIG. 11.

It is first assumed that, while either of the entrance and exit grills is rotated, the operational mode of the discriminating means with respect to the rotation thereof is such as shown by (A) in FIG. 11 wherein;

$\alpha$ represents a period in which the discriminating means is in position to permit the radiant beam of specific wave length to pass through the exit grill onto the photomultiplier tube, $\beta$ represents a period in which the discriminating means is in position to gradually interrupt the radiant beam of specific wave length, $\gamma$ represents a period in which the discriminating means is in position to entirely interrupt the radiant beams of specific wave length, and $\mu$ represents a period in which the discriminating means is in position to transfer from the period $\gamma$ to the period $\alpha$.

During the period $\alpha$, the intensity of the radiant beam of specific wave length can be sensed by the photomultiplier tube 38 while the switch $S_1$ is closed so that a capacitor $C_1$ can be charged. The switch $S_2$ is closed during the period $\gamma$ so that a capacitor $C_2$ can be charged. However, upon closure of the switch $S_3$ immediately after the commencement of the period $\mu$, the value of capacitance of each of the capacitors $C_1$ and $C_2$ can be differentially amplified by a differential amplifier $A_1$, the output of said amplifier $A_1$ being in turn applied to an amplifier $A_1$. These capacitors $C_1$ and $C_2$ will be discharged upon closure of the switch $S_4$, thus completing one cycle of operation.

A filter circuit 73 connected between the differential amplifier $A_2$ and the photomultiplier tube 38 to filter high frequency signals each representative of the intensity of a radiant beam other than the radiant beam of specific wave length to be detected.

It is to be noted that the present invention is not to be limited to the foregoing embodiments, but various modification and change are apparent to those skilled in the art. By way of example, the entrance grill or the exit grill may be installed in such a manner that each slit of the grill is in the parallel relation with respect to each slit of the other grill. In addition, the slit width of one grill may be different from that of the other grill.

What is claimed is:

1. A system for spectroscopic measurement comprising a light source, a first patterned grill member disposed at an entrance side in alignment with said light source, the beam of light which passes from said light source through said first patterned grill member carrying an image of said first grill member, diffraction means operatively associated with said first grill member for dispersing the beam of light passing through said first patterned grill member into a plurality of radiant beams each according to its wave length, a second patterned grill member disposed at an exit side for receiving a plurality of images of said first patterned grill member, which have been projected by the radiant beams dispersed by said diffraction means and for producing a plurality of superimposed striped patterns, means for synchronously rotating the first and second patterned grill members in a prescribed manner whereby the striped patterns formed by radiant beams except for a striped pattern formed by a radiant beam of a specific wave length to be measured which is in a static condition, can be varied and are in a dynamic condition and means for discriminating the static striped pattern formed by the radiant beam of specific wave length from the dynamic striped patterns formed by other radiant beams.

2. A system according to claim 1, wherein said first patterned grill member is of the same construction as that of said second patterned grill member and both are formed with a plurality of linearly equally juxtaposed slits.

3. A system according to claim 1, wherein said means for rotating the first and second patterned grill members rotates said members about an optical axis at the same speed and in the same direction.

4. A system according to claim 1, wherein said means for rotating the both first and second patterned grill members is an electrically operated motor device.

5. A system according to claim 1, wherein said discriminating means comprises a fixed mask having a plurality of linearly equally juxtaposed slits arranged such that each slit is in register with a corresponding opaque portion of the static striped pattern and an optical device, said mask and said optical device rotating in synchronism with the rotation of said second patterned grill member, and said optical device shifting all of the striped patterns formed on the second patterned grill member; said patterns having a moire appearance.

6. A system according to claim 5, wherein said optical device comprises a combination of an achromatic prism and a collimating lens whereby, when said prism is brought into register with the second patterned grill member, all of the radiant beams entering therethrough can be deflected so that each striped pattern can be shifted half a pitch and, when said lens is brought into register with the second patterned member, a radiant beam of specific wave length can be entirely shielded to permit the intensity of radiant energy screened through the striped patterns formed by the other radiant beams to be measured.

7. A system according to claim 5, wherein said optical device comprises a reflector device provided with a pair of reflector planes arranged in the displaced condition with respect to a common supporter shaft for supporting said reflector device.

8. A system according to claim 1, wherein either of said first and second patterned grill members is adjustable about an optical axis whereby each pitch defined between one strip to another of the striped pattern can be changed as desired.

9. A system according to claim 1, wherein each of said first and second patterned grill members is made of a resin film.

10. A system according to claim 1, wherein each of said first and second patterned grill members is made of metal.

11. A system according to claim 1, wherein said discriminating means comprises a movable mask formed with a plurality of linearly equally juxtaposed slits and adapted to be moved in a distance of the value substantially equal to a multiple of integer of half a pitch between one strip to another of the striped pattern formed by a radiant beam of specific wave length.

12. A system according to claim 11, wherein said movable mask is adapted to be moved in the direction at right angles to the lengthwise direction of each strip of the striped pattern formed by a radiant beam of specific wave length.

13. A system according to claim 11, wherein said movable mask is in the form of a cam plate.

14. A system according to claim 11, wherein said movable mask is adapted to be rotated in synchronism with the rotation of each of the first and second patterned grill members.

15. A system for spectroscopic measurement comprising a light source, a first patterned grill member disposed at an entrance side in alignment with said light source, the beam of light which passes through said first patterned grill member carrying an image of said first grill member, diffraction means operatively associated with said first grill member for dispersing the beam of light passing through said first patterned grill member into a plurality of radiant beams each according to its wave length, a second patterned grill member disposed at an exit side for receiving a plurality of images of said first patterned grill member, which have been projected by the radiant beams dispersed by said diffraction means and for producing a plurality of superimposed striped patterns, means for synchronously rotating the first and second patterned grill members in a prescribed manner whereby the striped patterns formed by radiant beams, except for a striped pattern formed by a radiant beam of a specific wave length to be measured which is in a static condition, can be varied and are in a dynamic condition, means for discriminating the static striped pattern formed by the radiant beam of specific wave length from the dynamic striped patterns formed by other radiant beams, and means for giving a pulsating characteristic to a beam of light screened through the striped patterns.

16. A system for spectroscopic measurement comprising a concave mirror, a patterned grill member operatively associated with said concave mirror and formed with a plurality of slits and disposed at the focus point of said concave mirror, a pair of reflector elements symmetrically disposed with respect to an optical axis passing through the center of curvature of said concave mirror, diffraction means for dispersing a beam of light passing from a light source through said first patterned grill member into a plurality of radiant beams each according to its wave length, said beam of light carrying an image of said patterned grill member after passage therethrough all of these optical elements being arranged such that a plurality of images of said patterned grill member can be formed on said patterned grill member to produce thereon striped patterns by means of radiant beams of different wave lengths dispersed by said diffraction means, and means for rotating said patterned member about the optical axis whereby, so long as said patterned member is rotated, one of the striped patterns which is formed by a radiant beam of specific wave length can be maintained in the static relation with respect to the patterned member while the remaining striped patterns which are formed by radiant beams of other wave lengths can be maintained in the dynamic relation to the patterned member.

17. A system according to claim 16, wherein said pair of the reflector elements disposed in the offset relation with respect to the optical axis.

18. A system according to claim 16, wherein said dispersing means is situated at one of the conjugate points of either of said reflector elements.

* * * * *